United States Patent [19]
Sasian-Alvarado

[11] Patent Number: 5,353,164
[45] Date of Patent: Oct. 4, 1994

[54] OBJECTIVE LENS FOR A FREE-SPACE PHOTONIC SWITCHING SYSTEM

[75] Inventor: Jose M. Sasian-Alvarado, Naperville, Ill.

[73] Assignee: AT&T Bell Laboratories, Murray Hill, N.J.

[21] Appl. No.: 969,495

[22] Filed: Oct. 30, 1992

[51] Int. Cl.⁵ .................. G02B 9/12; G02B 9/08
[52] U.S. Cl. .................. 359/791; 359/739; 359/784
[58] Field of Search .......... 359/656, 660–663, 359/689, 738–740, 754, 771–773, 776–780, 784–786, 789, 791

[56] References Cited

U.S. PATENT DOCUMENTS

| | | | |
|---|---|---|---|
| 2,055,859 | 9/1936 | Dieterich | 359/791 |
| 3,039,360 | 6/1962 | Hopkins | 359/791 |
| 3,733,404 | 11/1973 | Moore | 359/785 |
| 3,944,339 | 3/1976 | Momiyama | 359/739 |
| 4,082,415 | 4/1978 | Brooks et al. | 359/20 |
| 4,300,817 | 11/1981 | Betensky | 359/651 |
| 4,304,467 | 12/1981 | Rabedeau | 359/739 |
| 4,348,081 | 9/1982 | Betensky | 359/650 |
| 4,526,442 | 7/1985 | Betensky et al. | 359/651 |
| 4,740,067 | 4/9188 | Ueda | 359/739 |

Primary Examiner—Loha Ben
Assistant Examiner—Thong Nguyen
Attorney, Agent, or Firm—Wendy W. Koba

[57] ABSTRACT

An objective lens for a free-space photonic switching system is disclosed. The objective lens is utilized to change a collimated array of beams into an array of spots which will focus on the array of spatial light modulating elements (S-SEEDs, for example). The requirements for the lens (low f-number, field of view, etc.), result in a lens which includes an external stop, positive doublet, a positive (e.g., plano-convex) lens and a negative (e.g., field flattener) lens, the latter pair of lenses being separated by a predetermined distance d.

6 Claims, 2 Drawing Sheets

OBJECTIVE LENS FOR A FREE-SPACE PHOTONIC SWITCHING SYSTEM

TECHNICAL FIELD

The present invention relates to an objective lens for a free-space photonic switching system and, more particularly, to an objective lens capable of providing a focused array of spots to an associated array of photosensitive devices.

BACKGROUND OF THE INVENTION

Free-space photonic switching and computing systems utilize macroscopic optical elements such as holograms, gratings, lenses and mirrors as their basic hardware building blocks. In these systems, information is carried by arrays of beams of light which are collimated, manipulated and focused onto spatial light modulators in a stage-by-stage fashion. As such, free-space photonic switching systems provide the ability to interconnect a large number of communication channels at relatively high bit rates.

With respect to the design of lenses for a such free-space system, a number of requirements must be addressed. A lens is required to provide the focusing of a collimated beam array onto an array of light modulators. In order that each beam provide the correct "information", therefore, the light beams must be highly focused and distinct. In some cases, the beam arrays can be very large, on the order of a 64×64 element square. When the modulators utilized are symmetric self electro-effect devices (S-SEEDs), the switching speed is inversely proportion to the active window area of each S-SEED. Therefore, for relatively high rates of switching speed, relatively small active window areas are required. Thus, it is desired to minimize the f-number of the objective lens (to provide both a large numerical aperture and small spot size). Further requirements include diffraction-limited performance on a flat surface (essentially uniform illumination of the entire array) and telecentricity in the image space.

These and other requirements must therefore be considered when designing an objective lens for a free-space photonic switching system.

SUMMARY OF THE INVENTION

The requirements as outlined above are addressed by the present invention which relates to an objective lens for a free-space photonic switching system and, more particularly, to an objective lens which comprises relatively few components, yet provides a focused array of spot beams to an associated array of photosensitive devices.

In an exemplary embodiment, the objective lens of the present invention comprises a positive doublet lens, a positive (e.g., plano-convex) lens and a negative (e.g., field flattener) lens, the negative lens being separated a predetermined distance d from the positive lens.

It is an advantage of the objective lens of the present invention that the configuration involves only one flat surface, four different curvatures and two essentially equal thicknesses. The spacing between lenses may be easily controlled (and adjusted) by physical spacer elements to provide for various optical corrections (spherical aberration and coma, for example).

A further advantage of the objective lens of the present invention is the relative ease of manufacturability as related to the limited number of separate elements and coaxial relationship therebetween.

Other and further advantages of the objective lens of the present invention will become apparent during the course of the following discussion and by reference to the accompanying drawings.

BRIEF DESCRIPTION OF THE DRAWING

Referring now to the drawings where like numerals represent like parts in several views.

DETAILED DESCRIPTION

Figure 1:
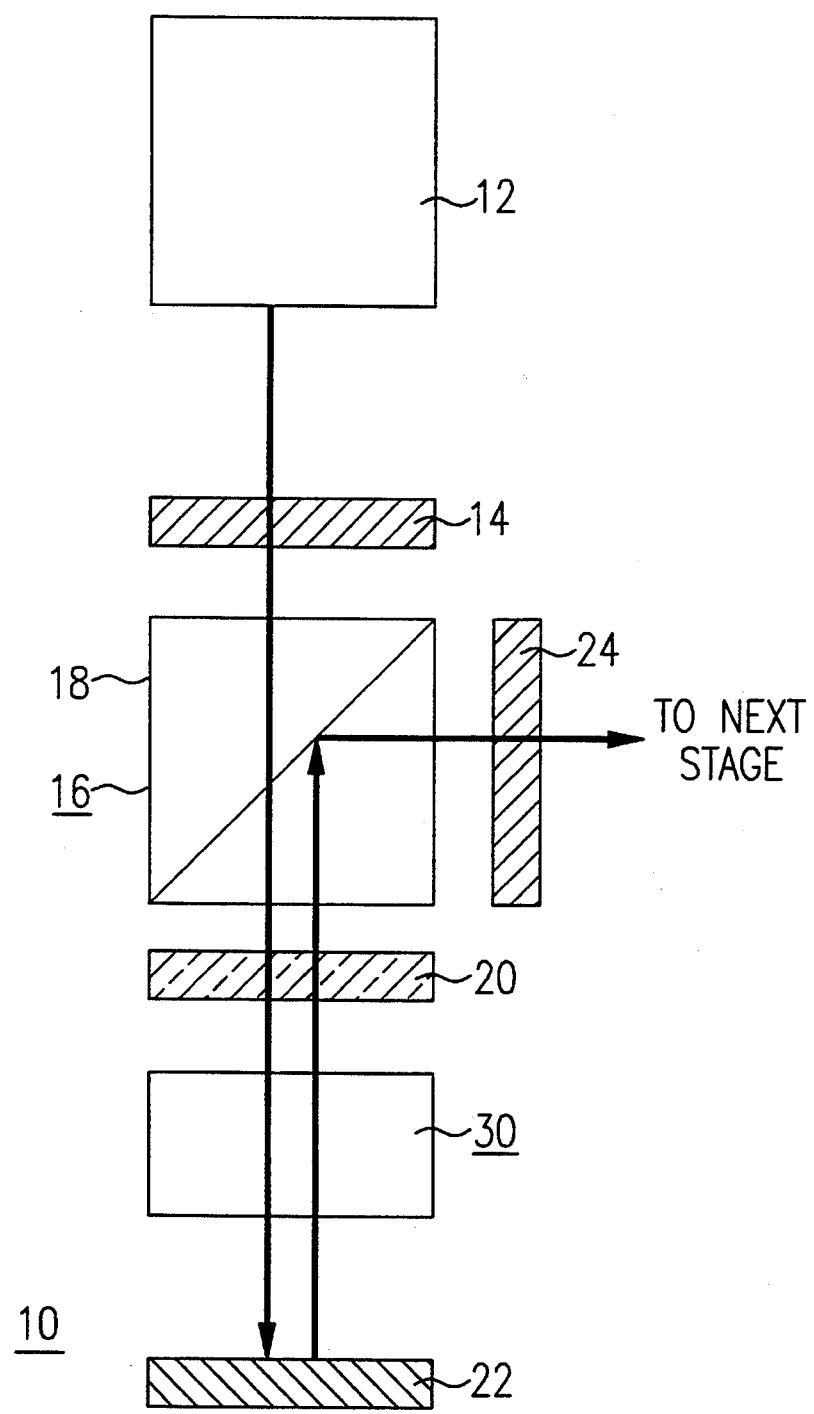
FIG. 1 illustrates an exemplary stage of a free-space photonic switching system which may utilize the objective lens configuration of the present invention.
Figure 2:
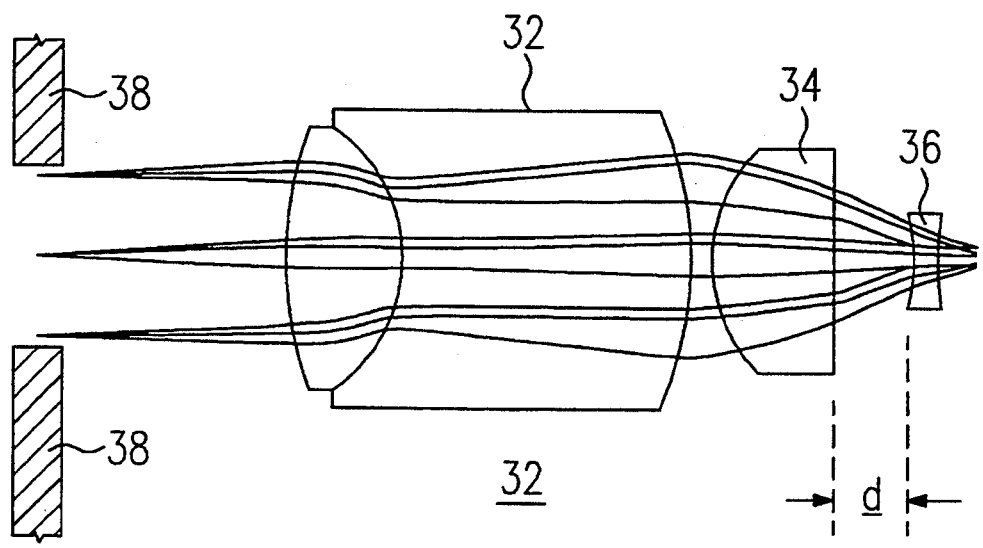
FIG. 2 contains a cross-section view of the objective lens of the present invention.
Figure 3:
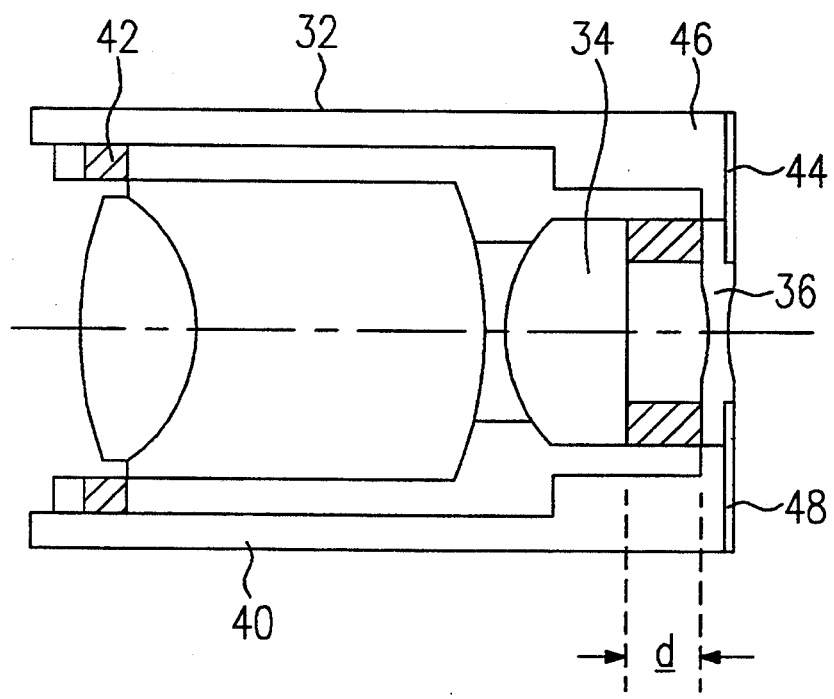
FIG. 3 contains a cross-section view of an assembled objective lens of the present invention.

FIG. 1 illustrates an exemplary stage 10 of an N-stage free-space photonic switching system. Stage 10 includes a high-power laser diode source 12, such as an AlGaAs semiconductor laser. The single collimated output beam from laser source 12 subsequently passes through a grating 14, such as a multi-phase (e.g., Dammann) grating, which generates an array of beams from the single collimated laser beam. The array output from grating 14 subsequently passes through an optical isolator 16, where isolator 16 includes in this particular embodiment a polarization beam splitting cube 18 and quarter wave plate 20. The array of beams from grating 14 will pass through isolator 16 relatively unimpeded. An objective lens 30, discussed in detail hereinafter in association with FIGS. 2 and 3, is used to change the collimated array output from grating 14 into an array of spots which will focus on the surface of a spatial light modulator 22, in this case an array of S-SEEDs. The spot array is subsequently modulated by S-SEEDs 22 and redirected through objective lens 30 (which functions, in this direction, to form a collimated array of beams). In the return direction, quarter wave plate 20 rotates the collimated array such that the array is reflected by polarization beam splitting cube 18 and directed into an interconnection hologram 24 which is coupled to the next stage of the free-space photonic switching system (not shown).

In general, therefore, objective lens 30 performs the function of focusing the collimated array of beams onto the array of the light modulating devices. To determine the required characteristics of objective lens 30, the following criteria need to be addressed. First, the stop location of objective lens 30 is defined by the position of grating 14. Therefore, the lens must include an external stop location so that isolator 16 may be inserted in the signal path between grating 14 and lens 30. The size and geometry of isolator 16 also influence the required separation between grating 14 and lens 30. Additionally, the lens must have an f-sin ($\theta$) distortion so that the spacing of the focused spots on array 22 is uniform as a function of the order of grating 14. When S-SEEDs are used as the array devices, their switching speed is inversely proportional to their active window size, as mentioned above. Therefore, to maximize system speed, it is desired to minimize the window size, which results in minimizing the f-number of the lens. Further, telecentricity of the lens in the image plane is desired to maintain the spot array size as the SEED array is focused, as well as to provide a symmetrical light path through the lens.

For a particular application, which will be discussed in detail in association with FIGS. 2 and 3, it was desired to provide a lens which was capable of focusing an array of spot beams onto an array of 4096 S-SEED elements (a 64×64 square array), with a spacing of approximately 0.02 mm between adjacent elements and an array diagonal length of approximately 1.81 mm (thus defining the field of view). Given the low f-number desired and the competing desire to provide a relatively compact overall system, a lens with a focal length of approximately 15 mm may be utilized, thus providing an angular field of view of 7°. It is to be understood that these particular dimensions are exemplary only, and may be modified as a function of the dimensions of the particular spatial light modulating array being employed.

An exemplary objective lens 30 which meets the various criteria discussed above is illustrated in FIG. 2. As shown, lens 30 includes a positive doublet 32, a positive lens 34, and a negative lens 36, where negative lens 36 is separated a predetermined distance d from positive lens 34. Positive lens 34 may be placed in physical contact with doublet lens 32. However, such physical contact may result in damage to the lenses and is therefore not recommended. As mentioned above, a necessary requirement for lens 30 is the provision of an external stop, so as to allow for the insertion of the redirecting components between the stop and the lens. In the arrangement shown in FIG. 2, stop 38 is located external to the lens system, and will lie in the plane of grating 14 (FIG. 1). Similar to a Petzval type lens, the use of positive doublet 32 provides for a relatively high numerical aperture over a small field of view (i.e., low f-number). Spherical aberration is controlled by the utilization of a high index glass in positive doublet 32. The utilization of a field flattener lens for negative lens 36 provides for correction of field curvature and distortion. Coma and astigmatism may be corrected by the relative lens powers, thicknesses and spacing d as necessary, by the user. An f-sin($\theta$) distortion may be introduced by the design of field flattener lens 36 (alternatively, an f-tan($\theta$) or f($\theta$) distortion may be introduced by changing the lens design). As shown in FIG. 2, the sum of all lens thicknesses is greater than the focal length f of lens 30. In a preferred embodiment, doublet 32 may comprise a relatively low index of refraction glass (such as BK7) and a relatively high index of refraction glass (such as LASFN18), positive (plano-convex) lens 34 may comprise BK7, and negative (field-flattener) lens 36 may comprise BAK4.

FIG. 3 illustrates objective lens 30 as assembled within a barrel housing 40. A first spacer 42 is included to provide lens alignment. A second spacer 44 rests upon the flat surface 46 of plano-convex lens 34 and an enlarged annular flat surface 48 formed around the periphery of field flattener lens 36. Upon assembly, spherical aberration may be corrected by adjusting the thickness d of second spacer 44. On-axis coma may be corrected simply by rotating either doublet lens 32, field flattener lens 36, or both. Any linear coma which may be present may be compensated by adjusted the thickness d' of first spacer 42.

What is claimed is:

1. A free-space photonic switching system comprising
    an optical source for producing as an output a collimated array of beams;
    an array of spatial light modulating devices; and
    an objective lens disposed between said optical source and said array of spatial light modulating devices, said objective lens positioned to receive as an input said collimated array of beams and utilized for focusing said array of collimated beams onto said array of spatial light modulating devices, the lens comprising
    a positive doublet lens;
    a positive lens disposed beyond said positive doublet lens;
    a negative lens separated a predetermined distance d from said positive lens; and
    an external stop located before the entrance of said positive doublet lens, wherein the collimated array passes through said external stop, enters the positive doublet lens and exits the negative lens, so as to provide a focused spot beam array on said array of spatial light modulating devices.

2. In the system of claim 1, the positive lens being separated from the positive doublet lens.

3. In the system of claim 1, the positive doublet lens comprising a first lens of a relatively low refractive index material and a second lens of a relatively high refractive index material.

4. In the system of claim 1, the positive lens comprising a plano-convex lens.

5. In the system of claim 4, the plano-convex lens comprising a relatively low refractive index material.

6. In the system of claim 1, the negative lens comprising a field flattener lens.

* * * * *